United States Patent [19]

Muter

[11] 4,314,195

[45] Feb. 2, 1982

[54] SOLID STATE CONTROL FOR MOTOR-GENERATOR WELDER

[75] Inventor: Bryce A. Muter, Troy, Ohio

[73] Assignee: Hobart Brothers Company, Troy, Ohio

[21] Appl. No.: 90,377

[22] Filed: Nov. 1, 1979

[51] Int. Cl.³ ............... H02M 7/155; H02P 9/30; H02P 13/16
[52] U.S. Cl. ................................. 322/90; 219/133; 363/87; 363/161
[58] Field of Search ............... 322/89, 90, 94, 28, 322/32; 323/22.5 C, 23, 4; 219/133, 134; 363/160, 161, 174, 87

[56] References Cited

U.S. PATENT DOCUMENTS

| | | | |
|---|---|---|---|
| 3,505,587 | 4/1970 | Carroll et al. | 322/25 |
| 3,593,121 | 7/1971 | Jones | 219/133 X |
| 3,621,368 | 11/1971 | Jules | 322/90 X |
| 3,676,694 | 7/1972 | Schneider et al. | 219/134 X |
| 3,704,408 | 11/1972 | Schroeder | 363/161 X |
| 3,770,976 | 11/1973 | Stroud et al. | 219/133 X |
| 3,832,620 | 8/1974 | Pollard | 363/87 X |
| 4,031,455 | 6/1977 | Beck | 219/133 X |
| 4,117,389 | 9/1978 | Hazumi et al. | 322/32 X |

Primary Examiner—Robert J. Hickey
Attorney, Agent, or Firm—Biebel, French & Nauman

[57] ABSTRACT

A solid state control circuit is connected to the output of an engine or motor driven alternator to provide a direct current output primarily for welding purposes. The control circuit includes gate controlled thyristors (SCRs) which are gated on at precise times within each cycle in order to provide an output having desired characteristics, such as constant current or constant voltage. Synchronizing windings associated with the alternator provide signals used to control the time of gating for the SCRs. Circuit means are included to insure that the control signals will be unaffected by any disturbances generated within the synchronizing signals due to the operation of the SCRs, and one such means includes an amplifier having a feedback circuit providing a hysteresis greater than any voltage change in the synchronizing signal caused by the operation of the SCRs.

2 Claims, 12 Drawing Figures

SOLID STATE CONTROL FOR MOTOR-GENERATOR WELDER

BACKGROUND OF THE INVENTION

This invention relates to a so-called motor generator welding power supply which includes an alternator, preferably having a three-phase output, rotated by a source of rotational energy, such as a gasoline or diesel engine or an electric motor. Prior art devices of this type have been available for many years with the output current and voltage from such devices controlled through the use of tapped alternating current reactors in the output circuit and controlling the excitation current to the alternator.

Over the past few years, welding power supplies of the stationary type have begun using solid state devices to control output current and voltage. These solid state devices typically use silicon controlled rectifiers (SCRs) whose time of conduction during each output cycle is varied according to the desired output conditions. Synchronizing signals are normally derived from the alternating current source.

When utilizing solid state devices to control the output from a motor generator, however, the operation or conduction of the SCRs causes such disturbances within the system as to make accurate control of the time of firing of the SCRs difficult unless provision is made to provide signal conditioning for the synchronizing signal.

The synchronizing signals are typically used in the generation of a ramp voltage which is compared to a control voltage established by a reference as modified by the actual output of the power source. This ramp voltage begins from some preestablished level, and decreases in a predetermined manner so that when the ramp voltage equals the control voltage, the SCR will be gated into conduction. If the synchronizing signal is distorted by the action of the SCRs when they begin conduction, then false ramp voltages may be generated, or the time the ramp voltage begins changing may be inaccurate.

It is preferred that the synchronizing signals be in exactly the same phase as the output from the power windings, and the best way to achieve this is to associate the synchronizing windings with power windings. This has been found to be an economical and reliable way of generating the synchronizing signals. However, at the same time, the waveform of the output from the synchronizing windings will contain distortions in the form of notches each time an SCR begins conduction.

There are alternative ways of creating synchronizing signals which are relatively free of these waveform distortions; however, these generally require that a separate alternator source be provided, such as using the field excitor alternator, or by using separate timing systems, such as coils and magnets on the armature shaft. However, all of these schemes require careful control over the position of the auxiliary or synchronizing windings in order to maintain precise phase relationship with the output from the alternator power windings.

SUMMARY OF THE INVENTION

The present invention is directed to a welding power source of the type including an alternator connected to a source of rotary power and a solid state rectifier and control circuit.

Specifically, an alternator having a three phase alternating current output, rotated by means of a motor or engine, includes means for providing synchronizing signals for use by a rectifier and control circuit. The rectifier circuit includes gate controlled thyristors, such as silicon controlled rectifiers (SCRs), which are gated into conduction by means of gate pulses produced by a control circuit. The control circuit includes means for sensing the output condition of the welder as compared to a reference, and generates the gating pulses at the appropriate phase angle by reference to the synchronizing signals. The output condition of the welder includes both output current and voltage.

When using synchronizing windings within the alternator itself, the effect of the conduction of the SCRs causes distortions in the waveform of the synchronizing signal, and therefore conditioning means are employed to insure that proper control over the output is maintained. In a preferred embodiment, the signal conditioning means includes an amplifier having a hysteresis which is greater than any change in voltage in the synchronizing signal caused by the action of the SCRs.

Accordingly, it is an object of this invention to provide a rotary welding power source comprising an alternator, including means for connecting it to a rotating source of power, for providing an alternating current output, means responsive to the rotation of said alternator for providing synchronizing signals, means for rectifying the alternating current output of said alternator for providing a direct current source of current for welding, said rectifying means including gate controlled thyristors, and control circuit means sensing the condition of the direct current output of said rectifying means as compared to a reference and responsive to said synchronizing signals for controlling the time of conduction of said gate controlled thyristors. In a preferred embodiment, the synchronizing signals are derived from windings associated with the main or power windings of the alternator, and wave forming means are connected between the synchronizing windings and the control circuit means to prevent distortions in synchronizing signal caused by the operation of the thyristors from causing inaccuracies in the operation of the control circuit.

Other objects and advantages of the invention will be apparent from the following description, the accompanying drawings and the appended claims.

DESCRIPTION OF THE PREFERRED EMBODIMENT

Figure 1:
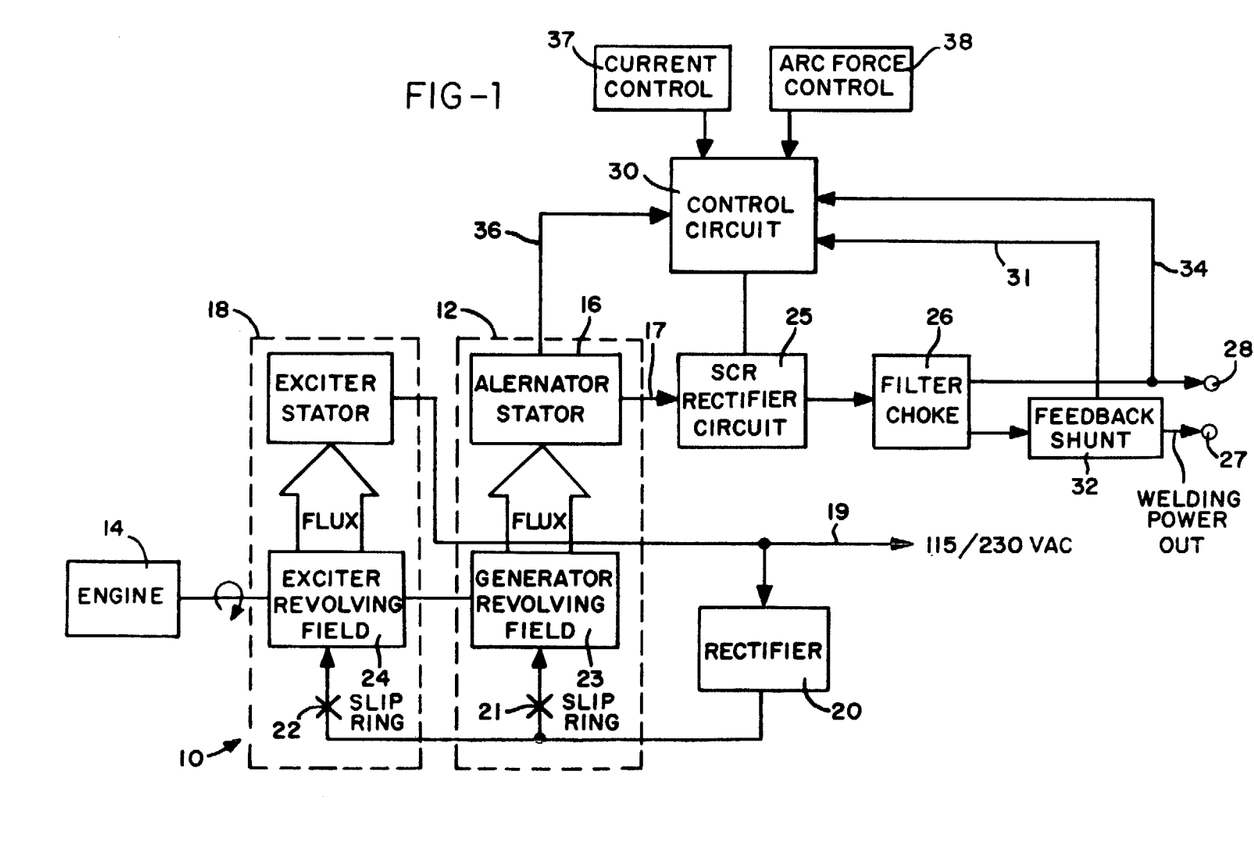
FIG. 1 is a block diagram of an engine or motor powered welder and associated rectifier and control circuit.

Referring now to the block diagram of FIG. 1, a welding power supply 10 constructed according to the present invention includes a three phase alternator 12 connected to a rotating source of power, such as an engine or motor 14. The alternator includes a plurality of main or power windings 16 forming a part of the stator which provide the alternating current output 17 of the alternator.

The power supply also includes a self-excited, single-phase alternator 18 having a 115 volt, sixty cycles output 19 for supplying power to auxiliary hand tools and also include a direct current rectifier 19 for providing current through slip rings 21, 22 to the armatures 23 and 24 of the alternator 12 and the exciter 18.

The three phase power output 17 of the alternator 12 is connected through a rectifier circuit 25 and filter choke 26 to the welder output terminals 27 and 28.

A control circuit 30 receives a current feedback signal on line 31 from a shunt 32 connected in series with the output of the welder, and it also receives a voltage feedback signal from a line 34 connected to the output terminal 28. The purpose of the control circuit is to cause the condition of the welder output to be maintained at a desired value, and it does this by controlling the phase angle when the SCRs or gate controlled thyristors within the rectifier circuit 25 conduct.

The control circuit 30 receives with synchronizing signals on line 36 preferably derived from synchronizing windings associated with each of the power windings in the alternator. It is preferred that the synchronizing windings be closely associated with the power windings in order to eliminate any errors to the phase relationship between the output waveform and the synchronizing signals, although it is possible that the synchronizing signals could be derived from other sources within the alternator or from the rotating power source.

The control circuit 30 is provided with reference signals from a current control potentiometer 37 and arc force potentiometer 38.

Figure 2:
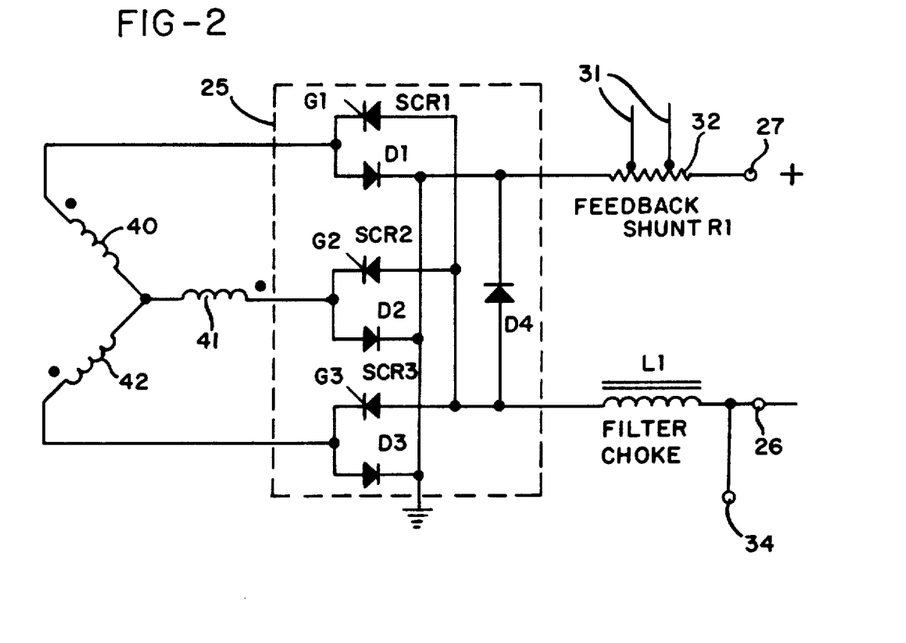
FIG. 2 is an electrical schematic diagram showing the connection between the power windings of the alternator and the rectifier circuit.

The rectifier circuit is shown generally in FIG. 2 and includes gate controlled thyristors or SCRs, SCR1-SCR3, and diodes D1-D3 connected to the power windings 40, 41 and 42 of the alternator stator 16. A flyback diode D4 is connected across the rectifier output. The positive output of the rectifier is connected to the output terminal 27 through the feedback shunt 32. The negative output of the rectifier is connected through filter choke 26 to the output terminal 28.

Figure 3:
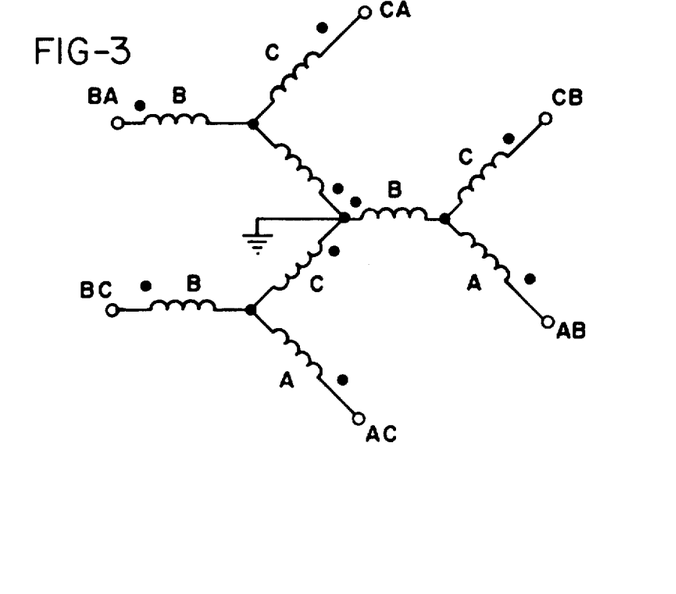
FIG. 3 is a schematic diagram of the auxiliary synchronizing windings employed in one embodiment of the invention.

The control circuit 30 is also provided with inputs from a plurality of synchronizing windings associated with the main windings, as shown in FIG. 3. There may be as many as three synchronizing windings associated with each main winding, and these may be arranged in a wye, and which are in turn connected in a wye configuration for the reasons which will be explained.

The synchronizing windings generate six voltages with respect to the common center point which is grounded. These six voltages represent all possible combinations of voltages needed to provide trigger signals to SCR1-SCR3. By way of example, SCR1 may be provided with synchronizing signals from terminals BA or CA, depending upon the direction of rotation of the alternator. Similarly, SCR2 may be provided with control signals from either terminals AB or CB, and SCR3 is provided with control signals from terminals AC or BC. Appropriate circuitry may be provided, if desired, to select the appropriate synchronizing signal depending upon the direction of rotation.

If the direction of rotation of the alternator is to always be the same, for example if the phase rotation is always A-B-C, then SCR1 will always be fired by voltage from terminal BA, SCR2 by terminal CB and SCR3 by terminal AC. That is the configuration shown in the full electrical schematic diagram of FIG. 3. In this case then only two synchronizing windings per power winding would be necessary.

Figures 7A, 7E:
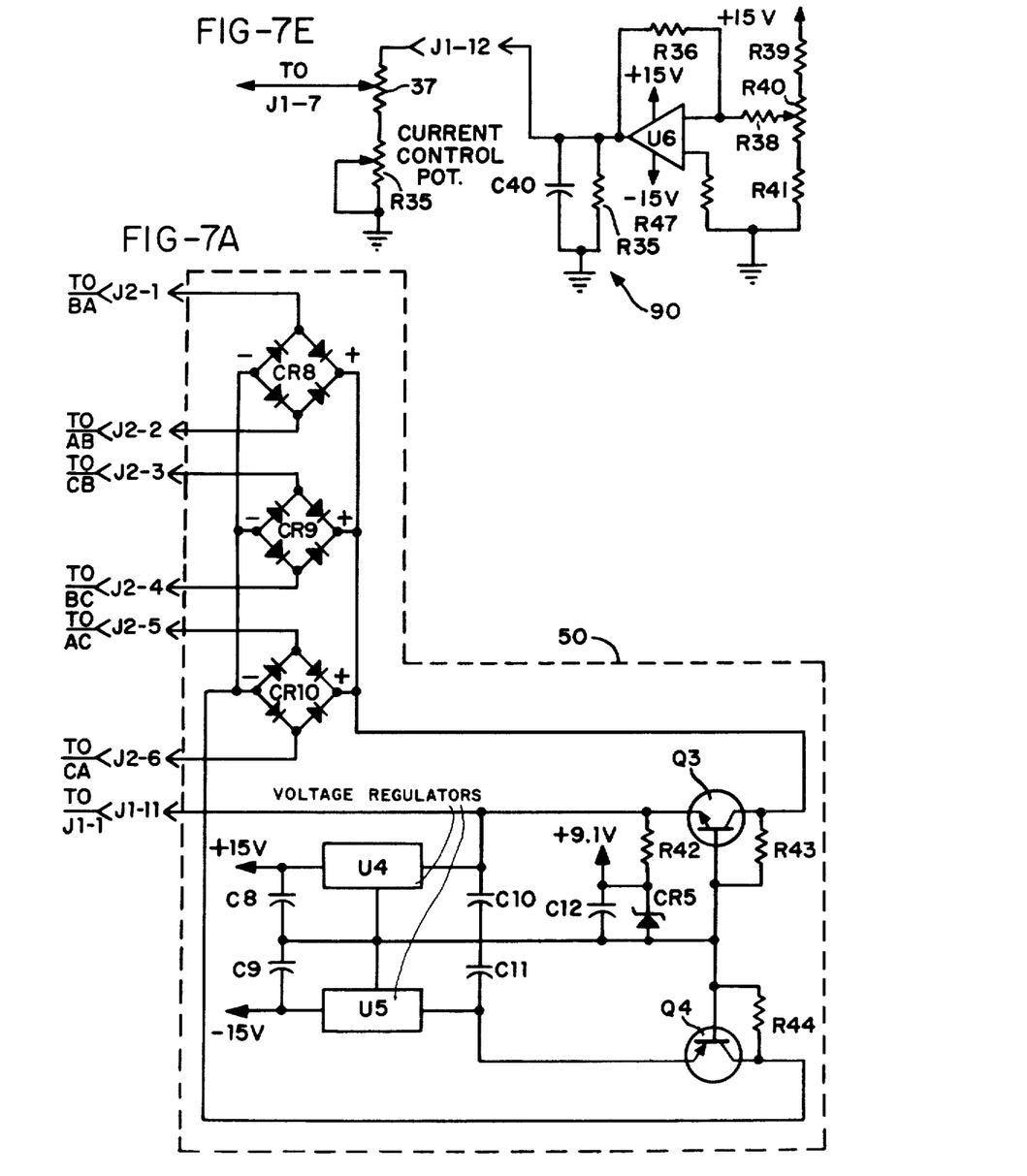
FIGS. 7A-7F together comprise a detailed electrical schematic diagram of the control circuit.

Referring now to the schematic diagram of FIG. 7 and particularly to FIG. 7A, the synchronizing windings are connected to terminals J2-1 through J2-6. Although only synchronizing signals BA, CB and AC will be used to control the firing of the SCRs in the rectifier circuit, all of the synchronizing windings are connected to bridge rectifiers CR8, CR9 and CR10 and are used to provide a source of power to the control circuit power supply 50.

The power supply 50 includes two regulator transistors Q3 and Q4, the emitter elements, with ground as a reference, provide a +24 and a −24 volt output to voltage regulators U4 and U5, respectively, the outputs of which are +15 volts and −15 volts. A +9.1 volt supply is also provided by the circuit including Zener diode CR5.

This power supply therefore provides a plurality of regulated voltages for use by the remainder of the control circuit.

Figure 6:
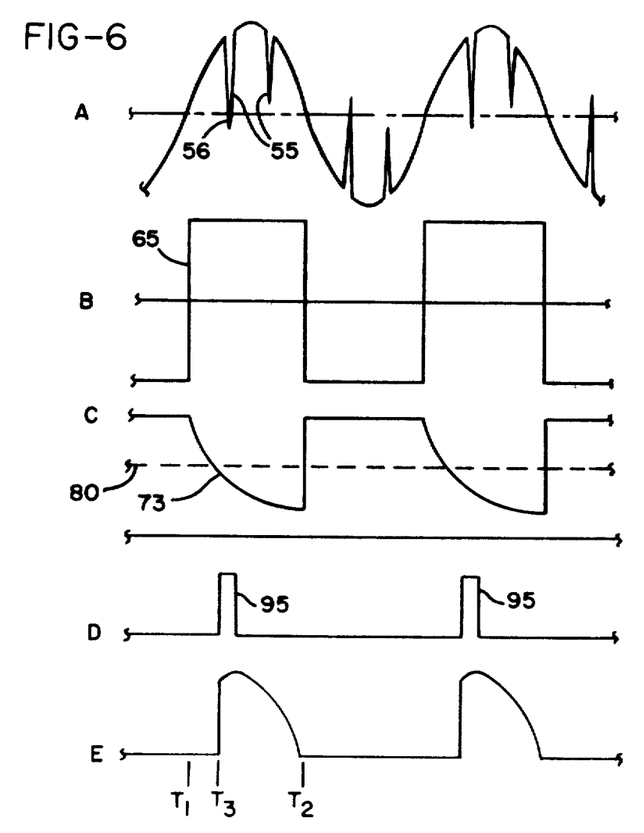
FIGS. 6A through 6E are waveform diagrams where 6A represents the alternating current output from one of the synchronizing windings, 6B represents the output from the waveform squaring circuit, 6C illustrates the output of the ramp generator, 6D represents the output from the pulse transformer, and 6E represents the current flow through one of the SCRs in the rectifier circuit.

The synchronizing signals each have a sinusoidal waveform as shown in FIG. 6A. The signal may include a plurality of spikes or distortions 55 caused principally by the operation of the SCRs. Some of these distortions may be large enough to drive the synchronizing voltage beyond zero, as at 56, and depending upon the type of sensing circuit used, a zero crossing may be detected at that point, causing the remainder of the circuit to malfunction because it would not be in proper phase with the alternating current output of the alternator.

In the preferred embodiment of the invention, means are provided to prevent these distortions or spikes in the waveform from being detected as zero crossings and therefore to provide a source of control signals unaffected by the operation of the gate controlled thyristors or SCRs in the rectifier circuit.

Three identical waveform squaring circuits 60, 61 and 62 (FIG. 7B) are connected to the BA (J2-1), CB (J2-3) and AC (J2-5) synchronizing outputs, but only circuit 60 will be described in detail and shown in FIG. 7C. Each circuit includes an operational amplifier U7 connected in the noninverting mode. Resistors R46 and R49 are adjusted to provide a hysteresis of such magnitude that the distortions in the waveform will have no effect on its output signal. Therefore, the synchronizing signal must not only pass through zero, but does so by a magnitude which is equal to the hysteresis before the output of the amplifier will change polarity.

FIG. 6B shows the output of the waveform squaring circuit. This signal 65 is a square wave, having its leading and trailing edges substantially in phase with the zero crossings of the synchronizing signal, but unaffected by spikes 55. Diode CR11 passes only the positive part of this signal to the ramp generator.

Figure 7B:
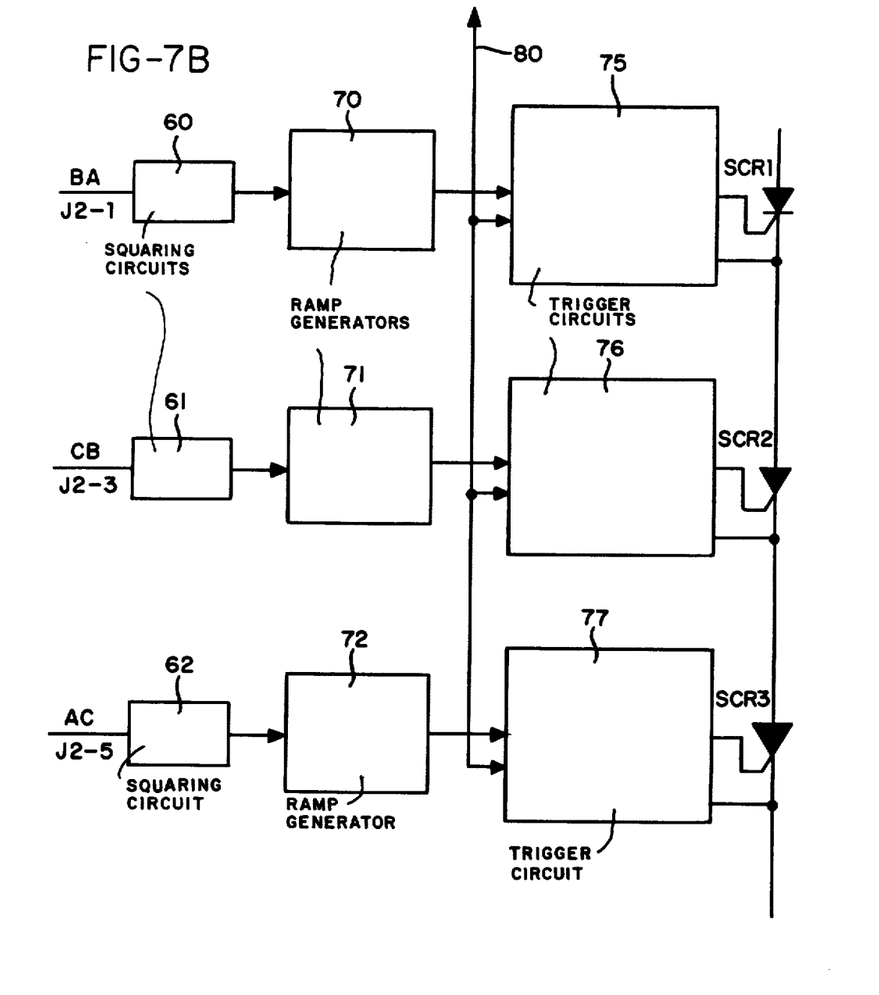
Figure 7C:
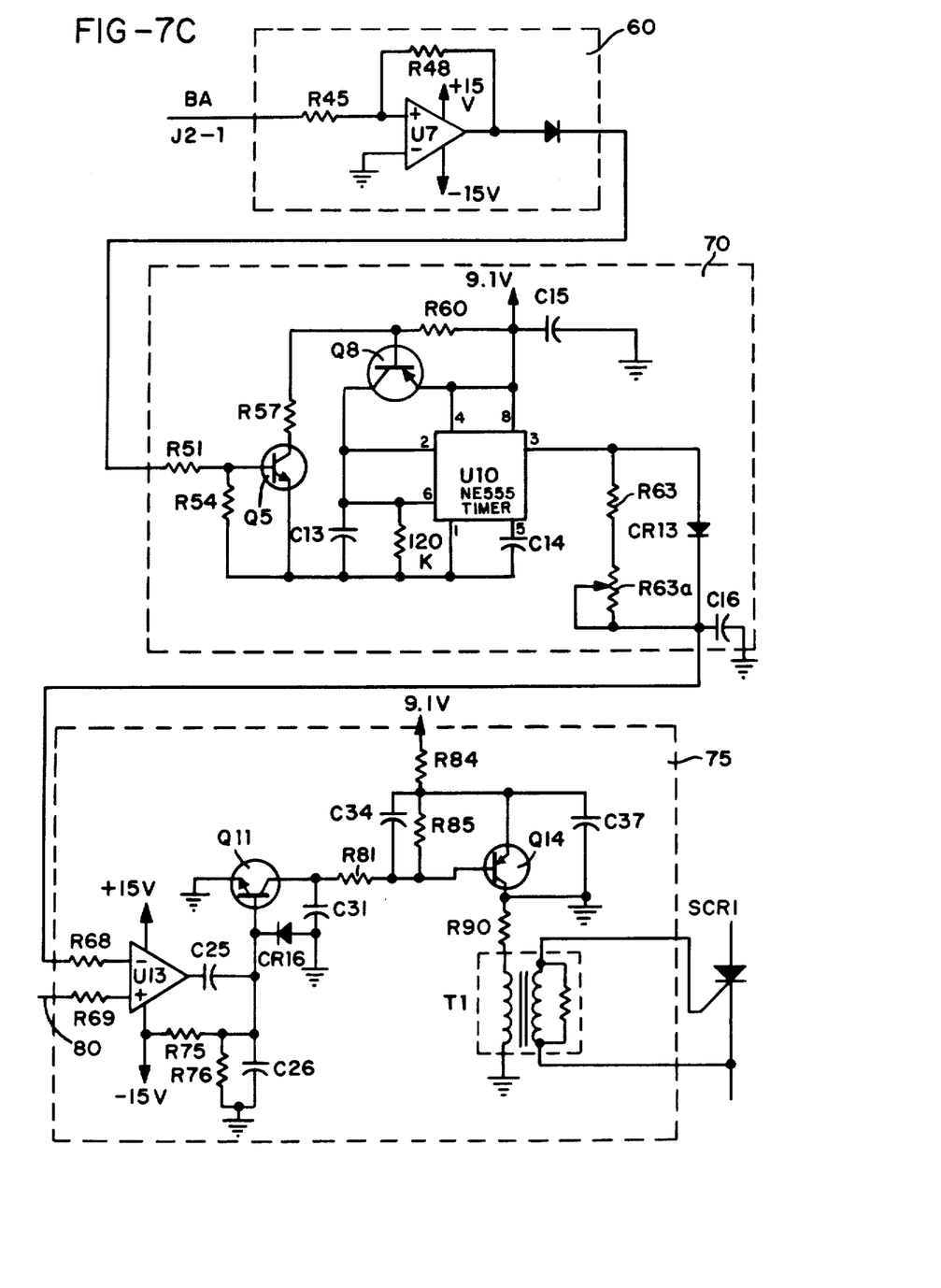

Three identical ramp generators 70, 71 and 72 FIG. 7B) are provided, with ramp generator 70 being described in detail and shown in FIG. 7C.

When the signal 65 goes positive, this is applied to the base transistor Q6, causing it to conduct and causes transistor Q9 also to conduct. Therefore a positive 9.1 volts will be applied to pins 2 and 6 of U10. U10 is a NE555 device, which is normally a timing device, but it is used in the embodiment as a convenient means for controlling current.

When pins 2 and 6 are positive, pin 3 is at ground potential; and when pins 2 and 6 are at ground, then pin 3 will reflect the voltage at pin 8, or 9.1 volts. U10 is therefore a convenient device for alternately connecting pin 3 between ground potential and 9.1 volts.

Therefore prior to time T1, the time wave form 65 goes positive, capacitor C16 will have charged to full potential through diode CR13. At T1, pins 2 and 6 will go positive, pin 3 will be connected to ground, and therefore C16 will begin to discharge through resistors R63 and R63a, as illustrated by the waveform 73 in FIG. 6C. This is a ramp voltage which is applied to the inverted input of comparator U-13 in the trigger circuit.

Thus, at time T1 when the synchronizing signal crosses zero in the positive going direction (ignoring any disturbance in the waveform), capacitor C16 will begin to discharge; and at time T2 when the synchronizing signal crosses zero in the negative going direction, capacitor C16 will be charged to the source voltage. It is therefore important for proper operation of the ramp circuit 70 that the capacitor begins its charge and discharge at the proper time in order to provide proper control over the firing of the SCRs.

There are three trigger circuits 75, 76 and 77, shown in FIG. 7B but only circuit 75 is shown and described in detail (FIG. 7C). Each trigger circuit compares the ramp voltage 73 to a control voltage 80 (shown as the dashed horizontal line in FIG. 6C), and when these two voltages are equal (or differ by some predetermined amount), then a gating signal will be applied to the SCR to cause it to be gated into conduction.

Figures 7D, 7F:
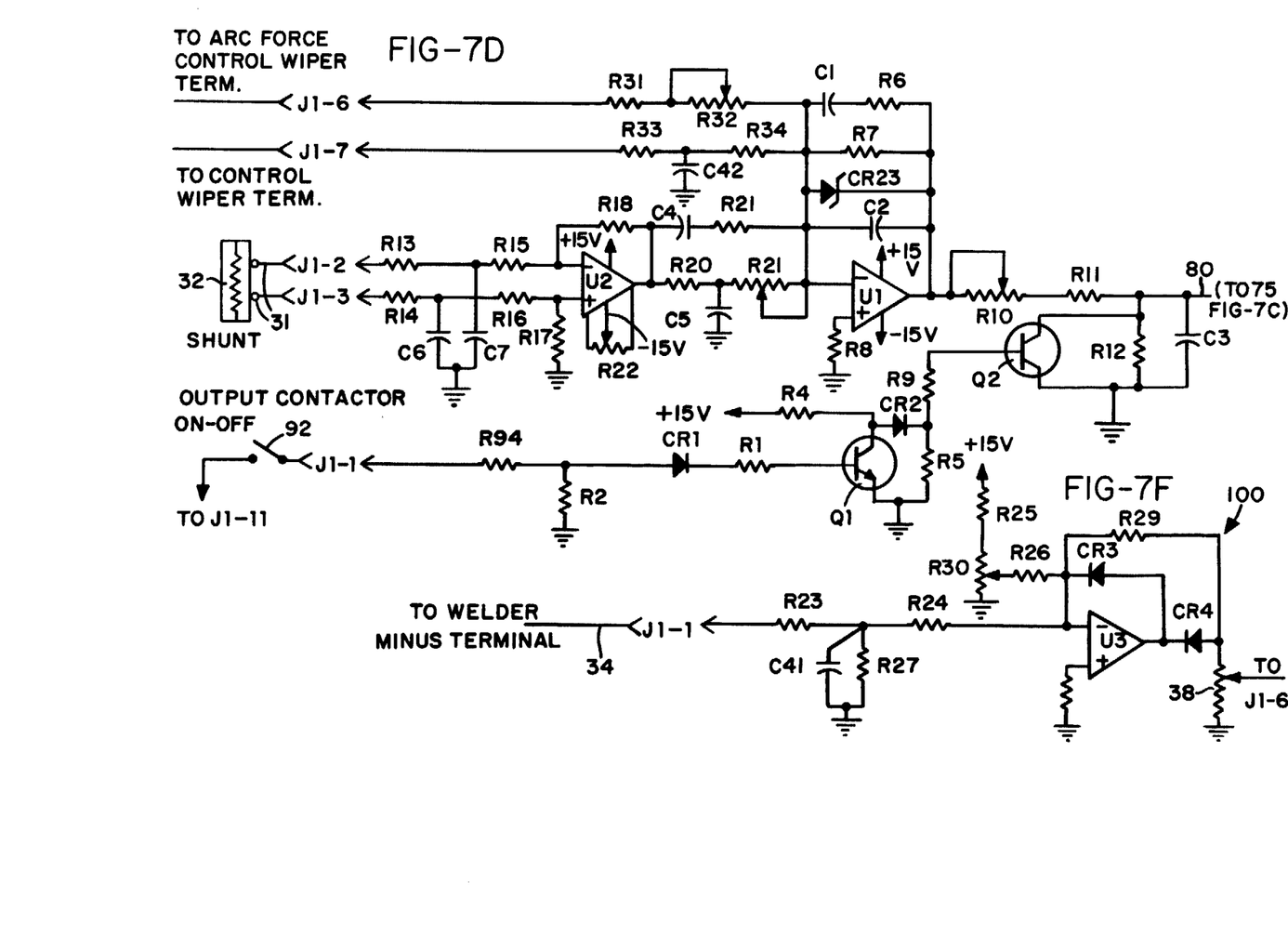

The control voltage 80 is developed by the circuit 85 shown in FIG. 7D. When operating the solid state welder as a constant current device, the shunt 32 in series with the welder output provides a voltage proportional to current at terminals J1-2 and J1-3 to amplifier U-2, the output of which is applied to the input of amplifier U-1 connected in the inverting mode. Thus, as the output current increases, the voltage output of U-1 will decrease, tending to reduce output current flow, and thereby maintain regulation.

The current level of the welder is set by the current control potentiometer 37 connected between terminals J1-10 and J1-12, with the wiper connected at terminal J1-7, as shown in FIG. 7D. The current control signal is a negative voltage which is also applied to the input of amplifier U-1 and establishes the desired current level for the welder.

A power supply 90 (FIG. 7E) provides a −10 volts at terminal J1-12 for the current control potentiometer 37. Potentiometer R35 is connected to the counterclockwise terminal of the current control potentiometer 37 to establish the minimum current level for the welder.

The control voltage 80 can be clamped to zero potential by means of the circuit including transistors Q1 and Q2. Transistor Q1 is connected at terminal J1-1 to an on-off control switch 92, and as long as that switch is open, transistor Q2 will conduct and hold the voltage on the control line 80 at essentially ground potential. Under these conditions, the SCRs and the main power supply rectifier will not conduct.

The voltage on the output line 80 of amplifier U-1 is represented by the dashed line in FIG. 6C, and when this voltage equals the voltage of ramp 70, the comparator U-13 will cause transistor Q1 to conduct, gating on transistor Q14, and discharging the energy stored in capacitor C37 into the pulse transformer T1, the secondary winding of which is connected to the gate electrode of SCR1. This is a pulse 95 represented in FIG. 6D. The time T3 of this pulse occurs therefore depends upon the magnitude of the voltage of the output of U-1, and therefore controls the phase angle at which the SCR1 conducts, as shown in FIG. 6E.

Figure 4:
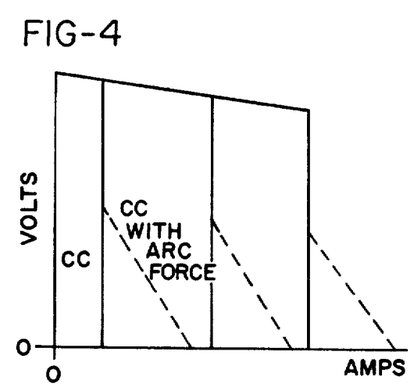
FIG. 4 is a waveform diagram illustrating the output of the welder when operated in the constant current mode.

The preferred embodiment is also provided with an arc force circuit 100 (FIG. 7F), the output of which, shown by the dashed line in FIG. 4, increases the current whenever the voltage at the electrode begins to decrease, such as when a short circuit condition occurs.

The arc force circuit 100 includes amplifier U-3, having an input at terminal J1-4 connected directly to the welding electrode by line 34 to sense the voltage thereon. The output of U-3 is a negative voltage which is applied to the clockwise terminal of the arc force potentiometer 38 through terminal J1-5. The wiper contact of potentiometer 38 is connected through J1-6 to the input of amplifier U-1. Thus, as the voltage at the electrode decreases, additional current will be applied to the welder to maintain the arc. The slope of the arc force curve depends on the setting of the arc force potentiometer 38.

Figure 5:
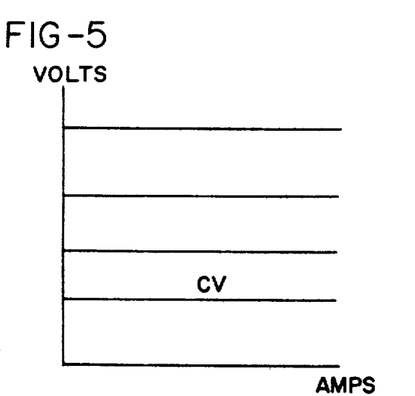
FIG. 5 is a waveform diagram showing the output of the welder when operated in the constant voltage mode.

The welder may also be operated in the constant voltage mode, as illustrated in FIG. 5. In this mode, the voltage on line 34 will be used as the primary input to amplifier U1, and the control circuit will function to adjust the phase angle of the SCR firing to maintain the present voltage level.

The values for the components used in a preferred embodiment of the invention are listed in the following table:

| Resistor | Value | Resistor | Value |
|---|---|---|---|
| R1 | 22K | R36 | 100K |
| R2 | 680 | R37 | 47K |
| R3 | 10K | R38 | 100K |
| R4 | 4.7K | R39 | 4.7K |
| R5 | 10K | R31 | 12K |
| R6 | 47K | R40 | 5K |
| R7 | 1 meg | R41 | 10K |
| R8 | 33L | R42 | 220 |
| R9 | 47K | R43 | 470 |
| R10 | 10K | R44 | 470 |
| R11 | 1K | R45 | 75K |
| R12 | 10K | R48 | 470K |
| R13 | 470 | R51 | 10K |
| R14 | 470 | R54 | 4.7K |
| R15 | 470 | R57 | 10K |
| R16 | 470 | R60 | 4.7K |
| R17 | 47K | R63 | 47K |
| R18 | 47K | R68 | 120K |
| R19 | 470 | R69 | 120K |
| R20 | 12K | R75 | 12K |
| R21 | 10K | R76 | 4.7K |
| R22 | 10K | R81 | 150 |
| R23 | 10K | R84 | 1K |
| R24 | 75K | R85 | 1K |
| R25 | 27K | R90 | 10 |
| R26 | 75K | R94 | 100 |
| R27 | 12K | | |

-continued

| | |
|---|---|
| R28 | 22K |
| R29 | 180K |
| R30 | 10K |
| R32 | 10K |
| R33 | 150 |
| R34 | 75K |
| R35 | 33K |

| Capacitor | Value |
|---|---|
| C1 | 0.047 mfd |
| C2 | 0.47 mfd |
| C3 | 0.047 |
| C4 | 0.33 mfd |
| C5 | 0.047 |
| C6 | 0.047 |
| C7 | 0.047 |
| C8 | 1.0 mfd |
| C9 | 1.0 mfd |
| C10 | 100 mfd, 50 volts |
| C11 | 100 mfd, 50 volts |
| C12 | 10 Mfd, 25 volts |
| C13 | 0.0022 mfd |
| C14 | 0.01 mfd |
| C16 | 0.047 |
| C25 | 0.047 |
| C26 | 0.047 |
| C34 | 0.047 |
| C37 | 1.5 mfd |
| C31 | 0.047 |
| C40 | 0.047 |
| C41 | 0.047 |
| C42 | 0.047 mgd |

| Tansistor | Component |
|---|---|
| Q1 | 2N3903 |
| Q2 | 2N3903 |
| Q3 | 2N4921 |
| Q4 | 2N4918 |
| Q5 | 2N3903 |
| Q8 | 2N3906 |
| Q11 | 2N3903 |
| Q14 | 2N4918 |

| Integrated Circuit | Component |
|---|---|
| U1 | LM741C |
| U2 | LM741C |
| U3 | LM741C |
| U4 | 7815 |
| U5 | 97M15 |
| U6 | LM741C |
| U7 | LM741C |
| U10 | NE-555 |
| U13 | LM741C |

| Bridge Rectifier | Component |
|---|---|
| CR8 | VM48 |
| CR9 | VM48 |
| CR10 | VM48 |

| Diodes | Component |
|---|---|
| CR1 | 1N3595 |
| CR2 | 1N4148 |
| CR5 | 9.1 volt |
| CR6 | 1N5360 |
| CR7 | 1N5360 |

-continued

| | |
|---|---|
| CR13 | 1N5395 |
| CR16 | 1N5395 |

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A rotary welding power source comprising
   an alternator, including means for connecting it to a rotating source of power, for providing an alternating current output,
   synchronizing windings within said alternator associated with the alternator power windings for providing synchronizing signals,
   means for rectifying the alternating current output of said alternator for providing a direct current source of current for welding, said rectifying means including gate controlled thyristors,
   control circuit means sensing the condition of the direct current output of said rectifying means as compared to a reference and responsive to said synchronizing signals for controlling the time of conduction of said gate controlled thyristors
   and means connected between said synchronizing windings and said control circuit means for providing a source of control signals unaffected by the operation of said gate controlled thyristors.

2. A motor or engine driven welding power source including
   a three phase alternator, rotated by said motor or engine, having windings for providing an alternating current output and synchronizing windings associated with each power winding for providing synchronizing signals,
   gate controlled thyristors associated with said power windings for rectifying the alternating current output to a direct current output for welding,
   control circuit means sensing the output condition of gate controlled thyristors as compared to a reference and responsive to said synchronizing signals for controlling the time of conduction of said gate controlled thyristors during each output cycle, and
   means connected between each of said synchronizing windings and said control circuit means for conditioning said synchronizing signals, said means including an amplifier connected in a noninverting mode having a feedback circuit for providing hysteresis greater than any voltage change in said synchronizing signal which may be caused by the operation of said gate controlled thyristors.

* * * * *